United States Patent

Kunii et al.

[11] Patent Number: 5,873,934
[45] Date of Patent: Feb. 23, 1999

[54] SURFACE-TREATING AGENT, SURFACE-TREATED PLATELETLIKE PIGMENT AND PROCESS FOR PRODUCTING THE SAME

[75] Inventors: Koshiro Kunii; Yoshifumi Horie, both of Iwaki, Japan

[73] Assignee: Merck Patent Gesellschaft MIT Beschrankter Haftung, Darmstadt, Germany

[21] Appl. No.: 750,348

[22] PCT Filed: Mar. 30, 1996

[86] PCT No.: PCT/EP96/01408

§ 371 Date: Dec. 9, 1996

§ 102(e) Date: Dec. 9, 1996

[87] PCT Pub. No.: WO96/32446

PCT Pub. Date: Oct. 17, 1996

[30] Foreign Application Priority Data

Apr. 10, 1995 [JP] Japan ..................................... 7-118874

[51] Int. Cl.⁶ ..................................................... C04B 14/20

[52] U.S. Cl. ........................... 106/417; 106/418; 106/446; 106/447

[58] Field of Search ..................................... 106/417, 418, 106/446, 447

[56] References Cited

U.S. PATENT DOCUMENTS 4,544,415  10/1985  Franz et al. .......................... 106/288 R
5,035,748   7/1991  Burrow et al. .......................... 106/499

Primary Examiner—Deborah Jones
Assistant Examiner—Amy M. Harding
Attorney, Agent, or Firm—Millen, White, Zelane, & Branigan P.C.

[57] ABSTRACT

A surface-treating agent for use in an inorganic pigment in which a metallic oxide layer and/or a hydrated metallic oxide layer is formed on the surface of said pigment, characterized in that said surface-treating agent contains one or more compounds selected from the group consisting of (1) a polyglycidyl ether compound, (2) a polyglycidyl ester compound, and (3) a diglycidyl polysiloxane compound.

10 Claims, No Drawings

SURFACE-TREATING AGENT, SURFACE-TREATED PLATELETLIKE PIGMENT AND PROCESS FOR PRODUCTING THE SAME

DETAILED DESCRIPTION OF THE INVENTION

1. Field of the Invention

The present invention relates to a surface-treating agent for use in an inorganic powder, and a surface-treated platelet-shaped pigment which is surface-treated with the surface-treating agent. More specifically, the present invention relates to a surface-treated platelet-shaped pigment which can suppress formation of a hard cake in a paint or an ink owing to settling during storage, transportation, coating or printing, and which can provide a coated product or a printed product having an improved water resistance.

2. Background

Pigments in a paint or an ink and insoluble substances making up the paint are, after the production, separated by settling with time during storage, or are gradually retained in a dead space and separated during transportation of a pipe line in coating. As a result, the color is deviated from the initial color, or segregation occurs, making it impossible to conduct desired coating or printing. Further, when the kind of the paint or the ink is changed, the paint which has been retained in the dead space of the coating/printing line is mixed to give an adverse effect.

In order to prevent the separation by settling, generally, a dispersant has been added or a paint has been blended with an anti-settling agent in advance. For example, anti-settling agents described in "Manual of Paint Starting Materials", p. 188, "3.2.1.9. Prevention of Thickening and Settling, Prevention of Sagging", such as organic bentonite, amide wax, hydrogenated castor oil wax, metallic soap, polyethylene oxide and sulfate ester anionic agent [for example, Disparon Series (trade name for a product of Kusumoto Kasei K.K.] and 371 F (trade name for a product of Hoechst AG); have been generally used. However, these anti-settling agents are not effective for any pigments and solids. The function and effect of the anti-settling agents vary depending on a combination of properties of the ingredients making up the paint or the ink, such as resins, solvents, pigments and dyes. Accordingly, the use of these anti-setting agents is limited. Besides, the anti-settling agent added acts not only on the effective site which is the surface of the solid, but is distributed throughout the system. Therefore, the anti-settling agent is consumed excessively, and the amount of the anti-settling agent tends to increase inadvantageously. Accordingly, development of a more effective anti-settling agent has been in demand.

Meanwhile, a pigment which has itself an anti-settling property, that is, a pigment having a surface that undergoes anti-settling treatment has been developed. Examples of the surface-treated pigment which is proposed on the basis of this idea include a pearl pigment which is coated with a polyester-polyurethane block copolymer having a tertiary amino group by a plasticizer, a solvent and a surface active agent (see Japanese Laid-Open Patent Application (Kokai) No. 63-46,266), a platelet-shaped pigment coated with poly-acrylate or polymethacrylate (see Japanese Laid-Open Patent Application (Kokai) No. 5,171,058) and a flaky substance to which fibrous particles having a particle diameter of from 0.1 to 20μ are adhered by a binder (see Japanese Laid-Open Patent Application (Kokai) No. 5,186-707).

On the other hand, a pearl pigment obtained by coating a metallic oxide or a hydrated metallic oxide on a platelet-shaped substance and a platelet-shaped pigment based on a platelet-shaped metallic oxide have been generally used widely as pigments for a paint, an ink and plastics. However, using these platelet-shaped pigments as such in a paint, an ink or the like for outdoor use, for example, for automobiles poses a problem with respect to a weatherability. A technology in which the weatherability has been improved is disclosed in, for example, Japanese Patent Publication Nos. 55-4,147 and 6-43,565 and Japanese Laid-Open Patent Application (Kokai) No. 1-292,067. Nevertheless, the pigment having the improved weatherability is not said to have a satisfactory anti-settling effect which is a serious problem when the pigment is actually used in the paint or the ink.

A pigment that exhibits both the anti-settling property and the weatherability when producing a coated product or a printed product has not been provided so far.

DISCLOSURE OF THE INVENTION

The present inventors have assiduously conducted investigations and development to solve the above-mentioned problems, and have consequently provided successfully a novel surface-treated platelet-shaped pigment which can suppress separation by settling of a platelet-shaped pigment in storage, transportation and use of a paint, an ink and the like and formation of a hard cake owing to the separation by settling, and which is useful for a paint, an ink and the like having a water resistance.

That is, the present invention is to provide a surface-treating agent for use in an inorganic powder in which a metallic oxide layer and/or a hydrated metallic oxide layer is formed on the surface, characterized in that said surface-treating agent contains one or more kinds of a polyglycidyl ether compound represented by formula (A)

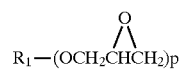

wherein $R_1$ denotes a dihydric or higher alcohol residue, and p is a figure of 2 or more, a polyglycidyl ester compound represented by formula (B)

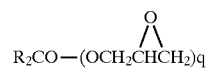

wherein $R_2CO-$ denotes a divalent or higher aromatic or aliphatic carboxylic acid residue, and q is a figure of 2 or more, and a diglycidyl polysiloxane compound represented by formula (C)

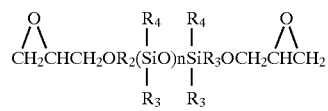

wherein $R_3$ denotes a polymethylene chain of the formula— $(CH_2)_m$—in which m is a figure of from 1 to 12, n is a figure of from 1 to 12, and $R_4$ and $R_5$ are the same or different and each denotes hydrogen or an alkyl group containing from 1 to 6 carbon atoms, a surface-treated platelet-shaped pigment which is surface-treated with the surface-treating agent, and a process for producing the same.

The present invention will be described in more detail below.

The polyglycidyl ether compound of formula (A) which is the surface-treating agent of the present invention is, for example, a polyglycidyl ether compound in which $R_1$ is a polyhydric alcohol residue such as alkylene glycol, glycerol, trimethylolpropane, diglycerol, polyglycerol, neopentyl glycol, pentaerythritol or sorbitol. Specific examples of the polyglycidyl ether compound include (poly)propylene glycol diglycidyl ether, (poly)ethylene glycol diglycidyl ether, polytetramethylene glycol diglycidyl ether, resorcinol diglycidyl ether, neopentyl glycol diglycidyl ether, 1,6-hexanediol diglycidyl ether, glycerol (poly)glycidyl ether, trimethylolpropane (poly)glycidyl ether, diglycerol (poly) glycidyl ether, polyglycerol (poly)glycidyl ether, sorbitol (poly)glycidyl ether, triglycidyl tris(2-hydroxyethyl) isocyanurate, pentaerythritol (poly)glycidyl ether, and sorbitol (poly)glycidyl ether.

Examples of the polyglycidyl ester compound of formula (B) include diglycidyl phthalate and diglycidyl adipate.

Examples of the compound of formula (C) include a diglycidyl polysiloxane compound in which m of $R_3$ is 3, n is 1, and $R_4$ and $R_5$ are methyl groups and having epoxy equivalent (weight per epoxy equivalent) of 180 (for example, 1,3-bis(3-glycidoxypropyl)-1,1,3,3-tetramethyldisiloxane), a diglycidyl polysiloxane compound in which n is 3 and having epoxy equivalent of 260, and a diglycidyl polysiloxane compound in which m of $R_3$ is 3, $R_4$ and $R_5$ are methyl groups, and n is 8 and having epoxy equivalent of 450.

The amount of the surface-treating agent used is from 0.3 to 10% by weight, preferably from 0.5 to 5% by weight based on the platelet-shaped pigment, though it slightly varies depending on the type of the surface-treating agent. When the amount is less than 0.3% by weight, the desirous effect is not enough. When the amount is more than 10% by weight, the effect is not increased so much.

The platelet-shaped pigment used in the present invention may be a platelet-shaped pigment of which the surface may be coated with the metallic oxide or the hydrated metallic oxide. Examples of the platelet-shaped pigment include a platelet-shaped pigment in which one or more metals selected from titanium, tin, iron, zirconium, cerium, zinc, chromium, cobalt, aluminum, silicon, manganese and copper are coated as an oxide or a hydrated oxide on a platelet-shaped substrate selected from platelet-shaped clay minerals such as mica, synthetic mica, sericite, kaolin and talc, and the platelet-shaped pigment which is further treated with a silane coupling agent to impart a weatherability.

The platelet-shaped pigment is preferably a pearl pigment obtained by coating on mica a metallic oxide such as titanium oxide, iron oxide, zirconium oxide, tin oxide, cerium oxide, zinc oxide, chromium oxide, cobalt oxide, aluminum oxide, silicon oxide, manganese oxide or copper oxide, or the metallic oxide which is hydrated, or a complex composition (mixture or layer) thereof. The typical example thereof is Iriodin (trade name for a product of Merck Japan). A pearl pigment in which titanium oxide coated on mica is lower titanium oxide that is partially reduced is naturally used. Anyhow, the pigments which are produced by the known method are used. Further, Iriodin WII (trade name) which is produced by a method described in Japanese Laid-Open Patent Application (Kokai) No. 1-292,067 is also used as the platelet-shaped pigment in the present invention.

Examples of other platelet-shaped pigments which are used in the present invention include platelet-shaped metallic oxides such as platelet-shaped iron oxide, platelet-shaped aluminum dissolved iron oxide in which aluminum is dissolved in iron oxide, platelet-shaped titanium oxide, platelet-shaped silicon oxide and platelet-shaped zirconium oxide; platelet-shaped pigments obtained by coating these platelet-shaped metallic oxides with metallic oxides different from those platelet-shaped metallic oxides, which are selected from titanium oxide, iron oxide, zirconium oxide, tin oxide, cerium oxide, zinc oxide, chromium oxide, cobalt oxide, aluminum oxide, silicon oxide, manganese oxide and copper oxide or those metallic oxides that are hydrated; those platelet-shaped pigments which are treated to impart a weatherability by a method described in Japanese Laid-Open Patent Application (Kokai) No. 1-292,067.

These pigments will be called "platelet-shaped pigments" hereinafter unless otherwise indicated.

As a process for producing the surface-treated platelet-shaped pigment in the present invention, the following a) or b) is employed.

a) A process which comprises charging a platelet-shaped pigment into a stirring mixer, adding gradually to the stirring mixer one or more kinds of the compounds represented by formulas (A), (B) and (C) as such or a solution obtained by diluting once the compound(s) with a solvent while stirring at a stirring blade head speed of from 3 m/sec to 80 m/sec, further mixing the mixture while stirring at the stirring blade head speed of from 3 m/sec to 80 m/sec, and then heat-treating the reaction mixture at from 60° to 160° C.

b) A process which comprises charging a platelet-shaped pigment into a stirring mixer, heating the platelet-shaped pigment at from 60° to 160° C. while stirring at a stirring blade head speed of from 3 m/sec to 80 m/sec, adding gradually to the stirring mixer one or more kinds of the compounds represented by formulas (A), (B) and (C) as such or a solution obtained by diluting once the compound(s) with a solvent, and further mixing the mixture while stirring at the stirring blade head speed of from 3 m/sec to 80 m/sec.

Examples of the stirring mixture which is used in the process of the present invention include a Waring blender, a Henschel mixer, a flow mixer, and a microspeed mixer.

The stirring blade head speed is preferably from 3 m/sec to 80 m/sec. When the head speed is as low as less than 3 m/sec, part of the substances are agglomerated or granulated, or the treating agent is adhered non-uniformly, making it impossible to obtain a surface-treated platelet-shaped pigment having desirous properties. When it is higher than 80 m/sec, the platelet-shaped pigment is destroyed undesirably.

The heat treatment during that time is conducted to fix the surface-treating agent on the surface of the platelet-shaped pigment. Unless the heat treatment is conducted, the effect is decreased. Accordingly, it is presumed that the compounds undergo some reaction on the surface. The temperature of the heat treatment is preferably from 60° to 160° C. An appropriate temperature is set depending on the boiling point and the reactivity of the surface-treating agent. It is advisable that the temperature of the heat treatment be from 100° to 150° C. in trimethylolpropane (poly)glycidyl ether (compound of formula (A)), from 80° to 150° C. in diglycidyl phthalate (compound of formula (B)), and from 90° to 150° C. in 1,3-bis)3-glycidoxypropyl)-1,1,3,3-tetramethyldisiloxane (epoxy equivalent 180). When the temperature of the heat treatment is lower than 60° C., the surface-treating agent is not fixed enough. When it is higher than 160° C., the surface-treating agent is evaporated or thermally decomposed, with the result that the effect is reduced and the heat loss in the production is great. Thus, it is undesirable.

This heat treatment is conducted while mixing the platelet-shaped pigment with the surface-treating agent through stirring (b) or the heat treatment is conducted separately after mixing the platelet-shaped pigment with the surface-treating agent through stirring (a). Especially, the method (b) is preferable from the standpoint of production efficiency because the agglomeration of particles is prevented simultaneously with the heat treatment. In the method (a) in which the heat treatment is conducted after the mixing through stirring, a milling step also is introduced thereafter. The milling may be conducted by means of the mixing stirrer or another new mill such as a beater mill or the like.

When the surface-treating agent of the present invention has a high viscosity, a solvent which does not affect a paint or an ink may be selected appropriately in advance and used as a diluent. Examples of the solvent include alcohols such as methanol and ethanol, ketones such as acetone, MEK and MIBK, and aromatics such as B, T and X. In this case, the solvent is evaporated simultaneously with the heat treatment. For example, the pressure is reduced or an inert gas is passed.

Effects

It has been confirmed that the surface-treated platelet-shaped pigment of the present invention has quite excellent characteristics that formation of a hard cake in a paint or an ink during storage, transportation and use can be suppressed and the water resistance of the coated film and the printed product can be improved. Further, the surface-treated platelet-shaped pigment of the present invention can be utilized, similarly to general pigments, in the field that does not require the water resistance so much, for example, in the kneading into plastics.

The present invention will be illustrated more specifically by referring to Examples, various evaluation tests and Application Examples. However, the present invention is not limited by these descriptions.

EXAMPLES

Production of a surface-treated platelet-shaped pigment

Example 1

One hundred grams of Iriodin 103 as a platelet-shaped pigment and 2 g of trimethylolpropane polyglycidyl ether were charged into a Waring blender and stirred at a blade head speed of 72 m/sec for 30 seconds. The obtained powder was heat-treated in a constant-temperature bath at 130° C. for 15 hours. The heat-treated powder was further stirred by means of the Waring blender at the blade head speed of 72 m/sec for 15 seconds to give a surface-treated platelet-shaped pigment.

Examples 2 to 10

Surface-treated platelet-shaped pigments shown in Table 1 were obtained in the same manner as in Example 1 except that the platelet-shaped pigment and the surface-treating agent were changed as shown in Table 1.

TABLE 1

Production of surface-treated platelet-shaped pigments

| Example No. | Platelet shaped pigment | Surface-treating agent | Amount used (%) |
|---|---|---|---|
| 1 | Iriodin 103*1) | trimethylolpropane polyglycidyl ether | 2 |
| 2 | Iriodin 103 | diglycidyl O-phtalate | 3 |
| 3 | Iriodin 103 | 1,3-bis(3-glycidoxypropyl)-1,1,3,3-tetramethyl-disiloxane (epoxy equivalent 180) | 2 |
| 4 | Iriodin 103 | trimethylolpropane polyglycidyl ether diglycidyl O-phthalate, 1,3-bis(3-glycidoxypropyl)-1,1,3,3-tetramethyl-disiloxane (epoxy equivalent 180) | 0.5 0.5 2 |
| 5 | Iriodin 103 | 1,3-bis(3-glycidoxypropyl)-1,1,3,3-tetramethyl-disiloxane (epoxy equivalent 180) | 1 |
| 6 | Iriodin 103 | 1,3-bis(3-glycidoxypropyl)-1,1,3,3-tetramethyl-disiloxane (epoxy equivalent 108) | 4 |
| 7 | Iriodin 103 | 1,3-bis(3-glycidoxyalkyl)-1,1,3,3-polysiloxane (m = 3, n = 8, $R_4 = R_5$(—$CH_3$), epoxy equivalent 450) | 2 |
| 8 | Iriodin 103WII*2) | 1,3-bis(3-glycidoxypropyl)-1,1,3,3-tetramethyl-disiloxane (epoxy equivalent 180) | 2 |
| 9 | Iriodin 300*3) | 1,3-bis(3-glycidoxypropyl)-1,1,3,3-tetramethyldisiloxane (epoxy equivalent 180) | 2 |
| 10 | Iriodin 300WII*4) | 1,3-bis(3-glycidoxypropyl)-1,1,3,3-tetramethyl-disiloxane (epoxy equivalent 180) | 2 |

*1)Iriodin 103: mica coated with rutile titanium oxide
*2)Iriodin 103WII: Iriodin 103 which is subjected to treatment with a hydrous zirconium oxide-type inorganic substance and an organic substance (hereinafter called WII-treated-product)
*3)Iriodin 300: mica coated with titanium oxide and iron oxide
*4)Iriodin 300WII: WII-treated-product of Iriodin 300

Example 11

One hundred grams of Iriodin 504 (mica coated with iron oxide) as a platelet-shaped pigment and 2 g of 1,3-bis-(3-glycidoxypropyl)-1,1,3,3-tetramethyldisiloxane (epoxy equivalent 180) were charged into a Waring blender and stirred at a blade head speed of 50 m/sec for 1 minute. The obtained powder was heat-treated in a constant-temperature bath at 130° C. for 15 hours. The heat-treated powder was further stirred by means of the Waring blender at the head blade speed of 50 m/sec for 15 seconds to give a surface-treated pigment.

Example 12

A surface-treated platelet-shaped pigment was obtained in the same manner as in Example 11 except that the pigment was replaced with Iriodin 504WII (WII-treated-product of iron oxide-coated mica).

Example 13

One hundred grams of Iriodin 103 as a platelet-shaped pigment and 2 g of propylene glycol diglycidyl ether as a surface-treating agent were charged into a Waring blender and stirred at a blade head speed of 72 m/sec for 30 seconds. The obtained powder was heat-treated in a constant-temperature bath at 110° C. for 15 hours. The heat-treated powder was further stirred by means of the Waring blender at the blade head speed of 72 m/sec for 15 seconds to give a surface-treated platelet-shaped pigment.

Example 14

One hundred grams of Iriodin 103 as a platelet-shaped pigment were charged into a Waring blender and stirred to 130° C. while stirring at a head speed of 30 m/sec. Two grams of 1,3bis(3-glycidoxypropyl)-1,1,3,3-tetramethyldisiloxane (epoxy equivalent 180) as a surface-treating agent were charged, and the mixture was treated at the blade head speed of 72 m/sec for 10 minutes. Further, the temperature was maintained at 130° C., and the heat treatment was conducted for 30 minutes while stirring at a blade head speed of 30 m/sec to obtain a surface-treated platelet-shaped pigment.

Example 15

Three kilograms of Iriodin 103WII as a platelet-shaped pigment were charged into a 20-liter Henschel mixer. Sixty grams of 1,3-bis(3-glycidoxypropyl)-1,1,3,3-tetramethyldisiloxane (3-glycidoxypropyl)-1,1,3,3-tetramethyldisiloxane (epoxy equivalent 180) as a surface-treating agent were gradually added while stirring at a head speed of 10 m/sec. The mixture was heat-treated at the blade head speed of 50 m/sec for 10 minutes. Further, the temperature was elevated to 130° C. while stirring at the blade head speed of 10 m/sec, and the heat treatment was conducted for 30 minutes to obtain a surface-treated platelet-shaped pigment.

Example 16

One hundred grams of a platelet-shaped iron oxide pigment having a particle diameter distribution of from 3 $\mu$m to 35 $\mu$m and an average particle diameter of 15 $\mu$m as a platelet-shaped pigment and 2 g of 1,3-bis(3-glycidoxypropyl)-1,1,3,3-tetramethyldisiloxane (epoxy equivalent 180) were charged into a Waring blender, and stirred at a blade head speed of 50 m/sec for 1 minute. The obtained powder was heat-treated in a constant-temperature bath at 130° C. for 15 hours. Further, the heat-treated powder was stirred by means of the Waring blender at the blade head speed of 50 m/sec for 15 seconds to give a surface-treated pigment.

Example 17

One hundred grams of the WII-treated-product of the platelet-shaped iron oxide and 2 g of 1,3-bis(3-glycidoxypropyl)-1,1,3,3-tetramethyldisiloxane (epoxy equivalent 180) as a surface-treating agent were charged into a Waring blender, and stirred at a blade head speed of 50 m/sec for 1 minute. The obtained powder was heat-treated in a constant-temperature bath at 130° C. for 15 hours. Further, the heat-treated powder was stirred by means of the Waring blender at the blade head speed of 50 m/sec for 15 seconds to obtain a surface-treated pigment.

Test for a settling property

Examples 18 to 34

Preparation of solvent-type pigments for evaluation and evaluation of the pigments:

Each (2.54 g) of the surface-treated platelet-shaped pigments obtained in Examples 1 to 17 to 105 g of a paint resin composition having the following formulation were mixed by means of a shaker to obtain a paint for evaluation.

Formulation of a paint resin composition for evaluation:

Acridic 47-712 (made by Dainippon Ink And Chemicals, Inc.):

70 parts by weight

Super Beckermin G821-60 (made by Dainippon Ink and Chemicals, Inc.): 30 parts by weight Toluene: 30 parts by weight Ethyl acetate: 50 parts by weight N-butanol: 10 parts by weight Solvesso #150 (made by Daishin Kagaku K.K.): 40 parts by weight Disparon 6900-20X (made by Kusumoto Kasei K.K.): 0.3 part by weight One hundred cubic centimeters of the thus-obtained solvent-type pigment for evaluation were charged into a stopper-equipped 100 cc cylinder (settling tube), and allowed to stand at room temperature for 24 hours. The cylinder was mounted on a shaker, and the number of shakings required to disperse the pigment which was separated by settling was measured. The small number of shakings means the less formation of a hard cake through separation by settling.

Table 2 shows the number of shakings in the test for the settling property (Examples 18 to 34) when using the platelet-shaped pigments which were not surface-treated (Comparative Examples 1 to 8) and the surface-treated platelet-shaped pigments (Examples 1 to 17) which were surface-treated according to the present invention. As a result, it was observed that the surface-treated platelet-shaped pigments according to the present invention all show the small number of shakings, meaning that the formation of the hard cake in the layer separated by settling is suppressed.

TABLE 2

Test for a settling property

| platelet-shaped pigment used | Number of shakings | |
|---|---|---|
| Iriodin 103 | 70 | Comparative Example 1 |
| Sample in Example 1 | 24 | Example 18 |
| Sample in Example 2 | 25 | Example 19 |
| Sample in Example 3 | 20 | Example 20 |
| Sample in Example 4 | 24 | Example 21 |
| Sample in Example 5 | 26 | Example 22 |
| Sample in Example 6 | 28 | Example 23 |
| Sample in Example 7 | 28 | Example 24 |
| Sample in Example 13 | 30 | Example 25 |
| Sample in Example 14 | 25 | Example 26 |
| Iriodin 103 WII | 60 | Comparative Example 2 |
| Sample in Example 8 | 40 | Example 27 |

TABLE 2-continued

Test for a settling property

| platelet-shaped pigment used | Number of shakings | |
|---|---|---|
| Iriodin 103 | 70 | Comparative Example 1 |
| Sample in Example 15 | 42 | Example 28 |
| Iriodin 300 | 72 | Comparative Example 3 |
| Sample in Example 9 | 30 | Example 29 |
| Iriodin 300 WII | 65 | Comparative Example 4 |
| Sample in Example 10 | 30 | Example 30 |
| Iriodin 504 | 42 | Comparative Example 5 |
| Sample in Example 11 | 21 | Example 31 |
| Iriodon 504 WII | 52 | Comparative Example 6 |
| Sample in Example 12 | 25 | Example 32 |
| Platelet-shaped iron oxide (particle diameter 3-35µ average particle diameter 15 H | 50 | Comparative Example 7 |
| Sample in Example 16 | 30 | Example 33 |
| WII-treated-product of platelet-shaped iron oxide | 53 | Comparative Example 8 |
| Sample in Example 17 | 32 | Example 34 |

- Test for water resistance
Preparation of a paint:
A (solvent-type):

One hundred grams of a solvent-type resin composition having the following formulation were mixed with 4.35 g of the platelet-shaped pigment for evaluation to form a base paint.

Formulation of a solvent-type resin composition

Acridic 47-712 (made by Dainippon Ink and Chemicals, Inc.): 70 parts by weight

Super Beckermin G821-60 (made by Dainippon Ink and Chemicals, Inc.): 30 parts by weight Toluene: 30 parts by weight Ethyl acetate: 50 parts by weight N-butanol: 10 parts by weight Solvesso #150 (made by Daishin Kagaku K.K.): 40 parts by weight A solvent-type resin composition having the following formulation was used as a top clear resin composition Formulation of a top clear resin composition:

Acridic 47-179 (made by Dainippon Ink And Chemicals, Inc.): 70 parts by weight

Super Beckermin L-117-60 (made by Dainippon Ink and Chemicals, Inc.): 30 parts by weight Toluene: 20 parts by weight MIBK: 20 parts by weight Butyl cellosolve: 10 parts by weight B (aqueous):

One hundred grams of an aqueous resin composition having the following formulation were mixed with 4.2 g of the platelet-shaped pigment for evaluation to form a base paint.

Formulation of an aqueous resin composition:

Water Sol S-751 (made by Dainippon Ink And Chemicals, Inc.): 70 parts by weight

Water Sol S-695 (made by Dainippon Ink And Chemicals, Inc.): 30 parts by weight

Isopropanol: 100 parts by weight

Production of a Black coated plate:

An under coat baking paint having the following formulation was coated on a bonderized plate by means of a spray (spray pressure 4 kg/cm$^2$) such that a thickness of a dry coated film became from 30 to 35 µm. The thus-coated plate was air-dried for 10 minutes, and baked at 150° C. for 40 minutes. Further, the surface of the coated film was polished with water and dried clean.

Formulation of an under coat baking paint:

Superlack F47 black (made by Nippon Paint Co., Ltd.): 100 parts by weight

Nippe Thinner 741 (made by Nippon Paint Co., Ltd.): 100 parts by weight

Production of a coated plate:

A (solvent-type):

The above-mentioned solvent-type base paint was coated on the above-mentioned black coated plate to a thickness of from 15 to 20 µm by means of a spray (spray pressure 5 kg/cm$^2$), and air-dried for 10 minutes. Then, a top clear paint was coated to a coated film thickness of from 25 to 30 µm, air-dried for 30 minutes, and baked at 130° C. for 20 minutes by means of an explosion-proof dryer to produce a coated plate for test.

B (aqueous):

An aqueous base paint was coated on the above-mentioned black coated plate to a thickness of from 15 to 20 µm by means of a spray (spray pressure 6 kg/cm$^2$), air-dried for 10 minutes, and then predried at 80° C. for 20 minutes. Subsequently, a top clear paint was coated such that a thickness of a dried coated film became from 25 to 30 µm. The thus-coated plate was air-dried for 30 minutes, and baked by means of an explosion-proof dryer at 140° C. for 30 minutes to produce a coated plate for test.

Test for water resistance and a method for evaluating the water resistance:

A (solvent-type):

The coated plate produced in the above-mentioned Production A was dipped in a bath containing hot water of 80° C., and withdrawn from the bath. A change of a shrinkage in the dipped portion was visually observed and evaluated with three grades.

B (aqueous):

The coated plate produced in the above-mentioned Production B was dipped in a bath containing hot water of 80° C., and withdrawn from the bath. A change of a shrinkage in the dipped portion was visually observed and evaluated with three grades.

Table 3 shows the results of the evaluation in the test for water resistance when using the platelet-shaped pigments which were not surface-treated and the surface-treated platelet-shaped pigments obtained in the present invention.

TABLE 3

Results of the test for water resistance

| Platelet-shaped pigment used | Solvent-type paint | Aqueous paint |
|---|---|---|
| Iriodin 103 | x | x |
| Sample in Example 1 | ○ | Δ |
| Sample in Example 2 | Δ | Δ |
| Sample in Example 3 | ○ | Δ |
| Sample in Example 4 | Δ | Δ |
| Sample in Example 5 | Δ | Δ |
| Sample in Example 6 | Δ | Δ |
| Sample in Example 7 | Δ | Δ |
| Sample in Example 13 | Δ | Δ |
| Sample in Example 14 | Δ | Δ |

TABLE 3-continued

Results of the test for water resistance

| Platelet-shaped pigment used | Solvent-type paint | Aqueous paint |
|---|---|---|
| Sample in Example 8 | ○ | Δ |
| Sample in Example 15 | ○ | Δ |
| Iriodin 300 | Δ | x |
| Sample in Example 9 | ○ | x |
| Iriodin 300WII | Δ | Δ |
| Sample in Example 10 | ○ | Δ |
| Iriodin 504 | x | x |
| Sample in Example 11 | Δ | Δ |
| Iriodin 504WII | Δ | x |
| Sample in Example 12 | ○ | x |
| Platelet-shaped iron oxide (particle diameter. 3-35μ average particle diameter 15μ | x | x |
| Sample in Example 16 | Δ | Δ |
| WII-treated-product of platelet-shaped oxide | Δ | x |
| Sample in Example 17 | ○ | Δ | x: notable shrinkage
Δ: slight shrinkage
○: negligibie shrinkage

From the above table, it has been found that the platelet-shaped pigments (Examples 1 to 17) treated in accordance with the present invention are greatly improved in the water resistance.

APPLICATION EXAMPLES

Application Example 1

This Application Example shows an example of an aqueous gravure ink in which a pigment is used for printing ink.

Formulation of an ink:

Aqua PAC Medium (made by Toyo Ink Mfg. Co., Ltd.): 50 parts by weight

Pigment obtained in Examples: 12.5 parts by weight

Deionized water was added to the ink having the above-mentioned formulation, and the viscosity was adjusted to 20 sec by Zahncup No. 3. The printing was then conducted.

Application Example 2

This Application Example shows an example of a gravure ink in which a pigment is used for printing ink.

Formulation of an ink:

CCST Medium (nitrocellulose resin: made by Toyo Ink Mfg. Co., Ltd.): 40 parts by weight Pigment obtained in Examples: 8 parts by weight An NC102 solvent (made by Toyo Ink Mfg. Co., Ltd.) was added to the ink having the above-mentioned formulation, and the viscosity was adjusted to 20 sec by Zahncup No. 3. The printing was then conducted.

Application Example 3

This Application Example shows an example in which a pigment is used for coloration of plastics.

Formulation:

Polyethylene resin (pellets): 100 parts by weight
Pigment obtained in Examples: 1 part by weight
Zinc stearate: 0.2 part by weight
Liquid paraffin: 0.1 part by weight The pellets having the above-mentioned formulation were dry-blended, and injection-molded by means of an injection-molding machine.

What we claim is:

1. A surface-treating agent for use with an inorganic pigment having a metallic oxide layer and/or a hydrated metallic oxide layer on its surface, wherein said surface-treating agent contains one or more compounds selected from the group consisting of:

(1) a polyglycidyl ether compound represented by the formula (A)

wherein $R_1$ denotes a dihydric or higher alcohol group, and p equals 2 or more, (2) a polyglycidyl ester compound represented by the formula (B)

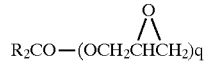

wherein $R_2CO-$ denotes a divalent or higher aromatic or aliphatic carboxylic acid group, and q equals 2 or more, and (3) a diglycidyl polysiloxane compound represented by the formula (C)

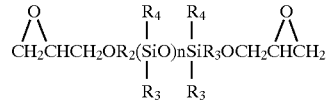

wherein $R_3$ denotes a polymethylene chain of the formula—$(CH_2)_m$—in which m equals 1 to 12, n equals 1 to 12, and $R_4$ and $R_5$ are the same or different and each denotes hydrogen or an alkyl group containing from 1 to 6 carbon atoms.

2. A surface-treated platelet-shaped pigment which is surface-treated with a surface-treating agent containing one or more compounds selected from the group consisting of:

(1) a polyglycidyl ether compound represented by the formula (A)

wherein $R_1$ denotes a dihydric or higher alcohol group, and p equals 2 or more, (2) a polyglycidyl ester compound represented by the formula (B)

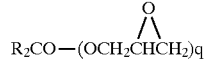

wherein $R_2CO-$ denotes a divalent or higher aromatic or aliphatic carboxylic acid group, and q equals 2 or more, and (3) a diglycidyl polysiloxane compound represented by the formula (C)

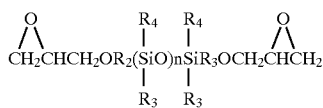

wherein $R_3$ denotes a polymethylene chain of the formula—$(CH_2)_m$—in which m equals 1 to 12, and $R_4$ and $R_5$ are the same or different and each denotes hydrogen or an alkyl group containing from 1 to 6 carbon atoms, wherein said surface-treating agent is present in an amount of from 0.3 to 10% by weight based on the platelet-shaped pigment.

3. The surface-treated platelet-shaped pigment of claim 2 wherein the platelet-shaped pigment is formed by coating a metallic oxide layer and/or a hydrated metallic oxide layer on a platelet-shaped substrate selected from platelet-shaped clay minerals such as mica, synthetic mica, sericite, kaolin and talc.

4. The surface-treated platelet-shaped pigment of claim 2 wherein the metallic oxide and/or the hydrated metallic oxide is an oxide and/or a hydrated oxide of one or more metals selected from titanium, tin, iron, zirconium, cerium, zinc, chromium, cobalt, aluminum, silicon, manganese and copper.

5. The surface-treated platelet-shaped pigment of claim 2 wherein the platelet-shaped pigment is a platelet-shaped metallic oxide selected from platelet-shaped iron oxide, platelet-shaped aluminum dissolved in iron oxide, platelet-shaped titanium oxide, platelet-shaped silicon oxide and platelet-shaped zirconium oxide, or the platelet-shaped metallic oxide further coated with other metallic oxide and/or hydrated metallic oxide.

6. The surface-treated platelet-shaped pigment of claim 2 wherein other metallic oxide and/or hydrated metallic oxide coated on the platelet-shaped metallic oxide is an oxide and/or a hydrated oxide of one or more different metals selected from titanium, tin, iron, zirconium, cerium, zinc, chromium, cobalt, aluminum, silicon, manganese and copper.

7. The surface-treated platelet-shaped pigment of claim 2 wherein the platelet-shaped pigment is treated with a silane coupling agent.

8. A process for producing a surface-treated platelet-shaped pigment said process comprising:

charging a platelet-shaped pigment into a stirring mixer, adding gradually to the stirring mixer one or more compounds optionally diluted with a solvent thereby forming a mixture while stirring at a stirring blade head speed of from 3 m/sec to 80 m/sec, further mixing the mixture while stirring at the stirring blade head speed of from 3 m/sec to 80 m/sec, and heat-treating the mixture at a temperature from 60° to 160° C., wherein said compounds are selected from the group consisting of:

(1) a polyglycidyl ether compound represented by the formula (A)

wherein $R_1$ denotes a dihydric or higher alcohol group, and p equals 2 or more, (2) a polyglycidyl ester compound represented by the formula (B)

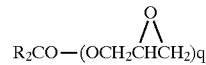

wherein $R_2CO$— denotes a divalent or higher aromatic or aliphatic carboxylic acid group, and q equals 2 or more, and (3) a diglycidyl polysiloxane compound represented by the formula (C)

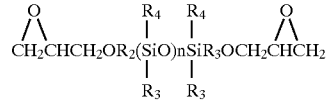

wherein $R_3$ denotes a polymethylene chain of the formula—$(CH_2)_m$—in which m equals 1 to 12, n equals 1 to 12, and $R_4$ and $R_5$ are the same or different and each denotes hydrogen or an alkyl group containing from 1 to 6 carbon atoms.

9. A process for producing a surface-treated platelet-shaped pigment said process comprising:

charging a platelet-shaped pigment into a stirring mixer, heating the platelet-shaped pigment at a temperature from 60° to 160° C. while stirring at a stirring blade head speed of from 3 m/sec to 80 m/sec, adding gradually to the stirring mixer one or more compounds optionally diluted with a solvent thereby forming a mixture, and further mixing the mixture while stirring at the stirring blade head speed of from 3 m/sec to 80 m/sec, wherein said compounds are selected from the group consisting of:

(1) a polyglycidyl ether compound represented by the formula (A)

wherein $R_1$ denotes a dihydric or higher alcohol group, and p equals 2 or more, (2) a polyglycidyl ester compound represented by the formula (B)

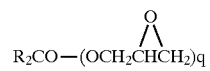

wherein $R_2CO$— denotes a divalent or higher aromatic or aliphatic carboxylic acid group, and q equals 2 or more, and (3) a diglycidyl polysiloxane compound represented by the formula (C)

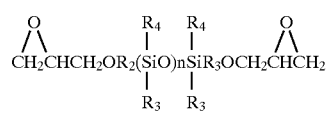

wherein $R_3$ denotes a polymethylene chain of the formula—$(CH_2)_m$—in which m equals 1 to 12, n equals 1 to 12, and $R_4$ and $R_5$ are the same or different and each denotes hydrogen or an alkyl group containing from 1 to 6 carbon atoms.

10. A paint composition or an ink composition containing a surface-treated platelet-shaped pigment which is surface-treated with a surface-treating agent containing one or more compounds selected from the group consisting of:

(1) a polyglycidyl ether compound represented by the formula (A)

wherein $R_1$ denotes a dihydric or higher alcohol group, and p equals 2 or more, (2) a polyglycidyl ester compound represented by the formula (B)

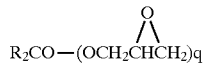

wherein $R_2CO-$ denotes a divalent or higher aromatic or aliphatic carboxylic acid group, and q equals 2 or more, and (3) a diglycidyl polysiloxane compound represented by the formula (C)

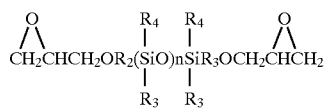

wherein $R_3$ denotes a polymethylene chain of the formula—$(CH_2)_m$—in which m equals 1 to 12, n equals 1 to 12, and $R_4$ and $R_5$ are the same or different and each denotes hydrogen or an alkyl group containing from 1 to 6 carbon atoms, wherein said surface-treating agent is present in an amount of from 0.3 to 10% by weight based on the plateletlike pigment.

* * * * *